United States Patent
Ribas et al.

(10) Patent No.: US 7,466,682 B1
(45) Date of Patent: Dec. 16, 2008

(54) FORWARD AND REVERSE LINK CAPACITY DETERMINATION

(75) Inventors: Hector Ribas, Overland Park, KS (US); John Humbert, Overland Park, KS (US); Abhijit Apte, Overland Park, KS (US); Ryan Talley, Olathe, KS (US); Meng Yew, Kansas City, MO (US); Michael Shafer, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 863 days.

(21) Appl. No.: 10/789,843

(22) Filed: Feb. 27, 2004

(51) Int. Cl.
 *H04B 7/216* (2006.01)
(52) U.S. Cl. ........... 370/342; 370/317; 370/441; 370/395.2; 370/479; 455/450; 455/453
(58) Field of Classification Search ........ 370/310, 370/328–329, 332, 335, 342, 322, 341, 348, 370/395.2–395.43; 455/450–453
See application file for complete search history.

(56) References Cited

U.S. PATENT DOCUMENTS

| | | | | |
|---|---|---|---|---|
| 5,490,165 A | * | 2/1996 | Blakeney et al. | 370/335 |
| 5,687,169 A | * | 11/1997 | Fullerton | 370/324 |
| 5,838,671 A | * | 11/1998 | Ishikawa et al. | 370/335 |
| 6,137,773 A | * | 10/2000 | Stilwell et al. | 370/209 |
| 6,222,832 B1 | * | 4/2001 | Proctor | 370/335 |
| 6,236,866 B1 | * | 5/2001 | Meyer et al. | 455/562.1 |
| 6,278,882 B1 | * | 8/2001 | Choi | 455/453 |
| 7,120,447 B1 | * | 10/2006 | Chheda et al. | 455/453 |
| 7,158,812 B2 | * | 1/2007 | Lee et al. | 455/561 |
| 2001/0019543 A1 | * | 9/2001 | Mueckenheim et al. | 370/329 |
| 2003/0022630 A1 | * | 1/2003 | Gandhi et al. | 455/69 |
| 2003/0218997 A1 | * | 11/2003 | Lohtia et al. | 370/335 |
| 2004/0219920 A1 | * | 11/2004 | Love et al. | 455/442 |
| 2004/0252669 A1 | * | 12/2004 | Hosein | 370/342 |
| 2005/0026624 A1 | * | 2/2005 | Gandhi et al. | 455/453 |

OTHER PUBLICATIONS

Marcus da Silva, "Interpreting CDMA Measurements," Jun. 24, 1998, www.rfglobal.com, all pages.*

* cited by examiner

*Primary Examiner*—Aung S Moe
*Assistant Examiner*—Curtis A Alia (57) ABSTRACT

Determining RF capacity of a wireless network and measuring BTS performance. Preferred methods include collecting forward link data at a BTS transmit port, where the data includes the power level associated with each Walsh code of each sector for each carrier over a predetermined time interval, and then processing the data by identifying each channel as using either second generation CDMA technology (a "2G" call) or third-generation technology (a "3G" call). Voice and data may also be identified. The power level may be determined by measuring a signal level (e.g., dB), and subsequently accounting for any RF losses through a calibration step, and finally converting the power-per-Walsh code to an absolute power level (e.g., dBm, or watts). The average user power per link (ppl) is then determined and the number of users per technology (2G versus 3G) is also determined.

17 Claims, 7 Drawing Sheets

FORWARD AND REVERSE LINK CAPACITY DETERMINATION

BACKGROUND

A. Field of Invention

The present invention is related to wireless communication systems, and more particularly, to a method and system of measuring forward and reverse channel capacity in a wireless base station.

B. Description of Related Art

In a typical wireless communication system, an area is divided geographically into a number of cell sites, each defined by one or more radiation patterns created by an emission of radio frequency (RF) electromagnetic (EM) waves from a respective base transceiver station (BTS) antenna. Similarly, BTS antennae are configured for the reception of EM waves emanating from mobile devices. Each cell site is typically further divided into two, three, or more sectors, where the sectors provide transmit and receive radio coverage for a selected area within the cell site.

Each sector has a plurality of individual signal channels—both forward (from the BTS to the mobiles) and reverse (from the mobile to the BTS). Specifically, in CDMA communication systems, the individual communication channels are separable due to their use of channel-specific concatenated coding sequences. In the forward channels, a unique PN code (commonly referred to as a short PN code offset) is used to distinguish channels in a given sector from those in surrounding sectors and cells. Within each sector, channels are further distinguished by yet another code, termed a Walsh code. In an adjacent sector, the Walsh codes may be reused because channel separation is provided by a different offset of the short PN code for that sector. Thus, the number of available forward channels (BTS to MS) on a given carrier frequency in a sector is limited by the number of available Walsh codes. In the ANSI/TIA/EIA-95-B-99 standard entitled "Mobile Station-Base Station Compatibility Standard for Wideband Spread Spectrum Cellular Systems" (published Feb. 1, 1999), the contents of which are incorporated by reference herein, there are sixty-four available Walsh codes, while in CDMA 2000 series (TIA/EIA IS-2000 Series, Rev. A, published Mar. 1, 2000), one hundred twenty-eight Walsh codes are available. Both of the ANSI/TIA/EIA-95-B-99 and the TIA/EIA IS-2000 Series, Rev. A, standards are incorporated herein by reference, and are available from the Telecommunication Industry Association, 2500 Wilson Boulevard, Suite 300, Arlington, Va. 22201.

On the reverse channel, from the mobile to the BTS, a slightly different code concatenation is used. The Walsh codes are used to identify a data symbol alphabet, the short PN code is used for synchronization purposes, and the long code PN code is used to identify the individual mobile channel.

There are many factors that determine how many channels can coexist in a given cell or sector—inter-user interference being a significant one. That is, although the coding of the individual forward and reverse channels allows them to be distinguished from one another, each channel nonetheless causes a certain amount of interference with the other channels. For the forward channels, the cumulative interference of the traffic channels must not prevent the mobiles from receiving the pilot, sync and paging channels. Typically, about twenty-five percent of the transmitted power must be reserved for the pilot, sync and paging channels. For the reverse channels, the base station is receiving signal energy from all of the active mobiles. For the channel of interest, the other mobiles appear as interfering noise, which makes it appear as if the effective noise floor is rising. This effect, therefore, is referred to as "reverse noise rise"(RNR). The increased RNR causes the mobile to have to transmit at a higher power level, which in turn causes an increase in the RNR for the other mobiles. Thus, overall system capacity is related to how RNR is affected by additional mobile units.

Theoretical capacity limits have been developed to predict system capacity, such as the pole point equation. The pole point equation specifies the point at which an additional mobile would require an infinite amount of power, and for a six-sectored site for radio configuration 1 and EVRC, is given by:

$$\text{Pole\_Point} = \frac{\text{Processing\_Gain}}{\frac{6}{SG} * VAF * (1 + INT) * \frac{E_b}{N_o}} + 1,$$

where Processing Gain=Bandwidth/Data Rate (1228800 Hz/9600 bits per sec, or 128); SG=Sectorization Gain=4.5; VAF=Voice Activity Factor=0.40; TNT=Adjacent Cell Interference=0.60; Eb/No=the ratio of the energy per bit to the orthogonal noise=6.2 dB=4.17. These values predict a pole point value of:

$$\text{Pole\_Point} = \frac{128}{\frac{6}{4.5} * 0.40 * (1 + 0.60) * 4.17} + 1 = 36.9 \text{ users}$$

Thus, when designing a system to have a capacity of fifty percent of the pole point, a value of 18.4 users is predicted. However, actual system performance varies significantly from the performance predicted from theoretical models. Such models may not accurately account for the effects of, for example, newly developed power control algorithms, or particular geographic layouts of sectors, or the time-varying geographical distribution of users within the sector. As a result, actual measurements of cell/sector channel usage may be preferred.

Current techniques of data collection offered by BTS manufacturers is insufficient to obtain a complete understanding of the cell and sector loading, interferences levels, and other characteristics necessary to determine the true network performance. Typically, presently available systems provide small samplings of data, if any. Consequently, a capacity measurement system and method that overcomes the current limitations is needed.

SUMMARY

A method of measuring BTS performance is provided. Preferred methods include collecting forward link data at a BTS transmit port, where the data includes the power level associated with each Walsh code of each sector for each carrier over a predetermined time interval, and then processing the data to determine system capacity. Preferably, system capacity is determined by analyzing the data to determine how many users may be active without exceeding an RNR threshold. The analysis may also be conditioned on a probability that the Reverse Noise Rise (RNR) threshold not be exceeded, since actual RNR levels for a given number of users may vary depending on various factors. In addition, system capacity may be determined in terms of a number of calls using second generation CDMA technology (a "2G" call) or third-generation technology (a "3G" call). Voice and data may also be identified and analyzed separately.

The power level may be determined by measuring a signal level (e.g., dB), and subsequently accounting for any RF losses through a calibration step, and finally converting the power-per-Walsh code to an absolute power level (e.g., dBm, or watts). The average user power per link (ppl) is then determined and the number of users per technology (2G versus 3G) is also determined.

The method also preferably collects reverse link data in the same time interval, where the data includes the corresponding RNR. First, a maintenance window noise floor and the bouncing busy hour (BBH) for the site are determined. Then the RNR is determined from the BBH noise floor with respect to the maintenance window noise floor. Alternatively, measurements from one time period may compared directly to another time period without reference to the maintenance window noise floor.

Some preferred methods include displaying the resulting data in one or more of the following formats: power per link (ppl) cumulative distribution function (cdf) and probability distribution function (pdf) plots, where the plots may also be broken down by 2G and 3G technology; the number of users per 2G/3G technology versus time; the ppl per 2G/3G technology versus time; the ratio of the number of users to the ppl per 2G/3G technology; or a three-dimensional graph depicting the number of users versus RNR versus percentage group (or probability).

The preferred methods may be used as a capacity planning validation tool, or to validate the capacity gain of one radio configuration over another (e.g., RC3 (3G) versus RC1 (2G). In addition, the preferred methods may be used to verify or test existing or modified power control algorithms or other system settings.

These as well as other features and advantages of the present invention will become apparent to those of ordinary skill in the art by reading the following detailed description, with appropriate reference to the accompanying drawings.

BRIEF DESCRIPTION OF FIGURES

Reference is made to the attached drawings, wherein elements that have the same reference numeral designations represent like elements throughout and wherein.

DETAILED DESCRIPTION OF EXEMPLARY EMBODIMENTS

A. Wireless Communication System

Figure 1:
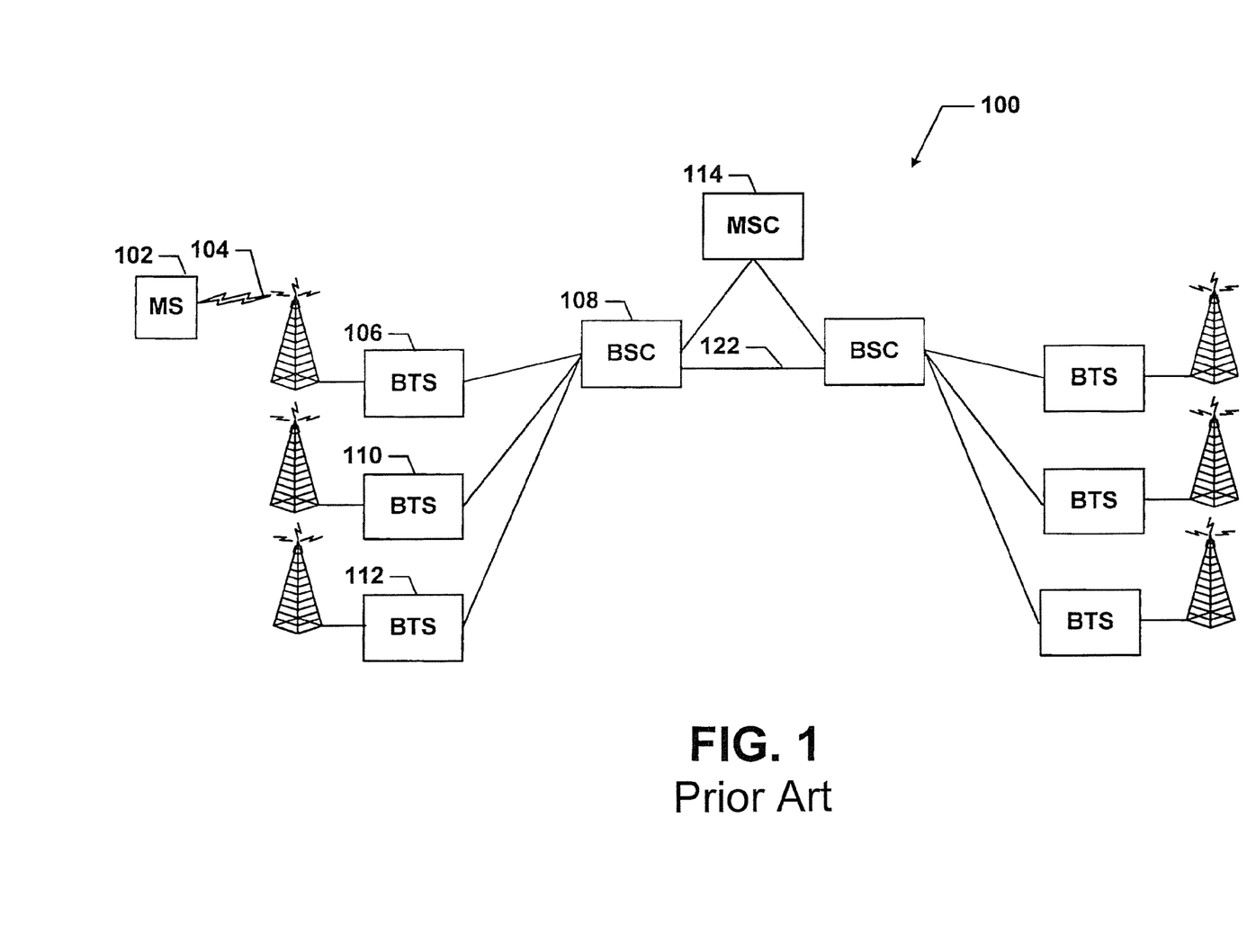
FIG. 1 is a block diagram illustrating one embodiment of a wireless communication system.

In accordance with an exemplary embodiment, a method and system of determining BTS cell and sector capacity within a wireless communication system is provided. Referring to FIG. 1, a block diagram illustrating one embodiment of a wireless communication system 100 is provided. It should be understood that this and other arrangements described herein are set forth for purposes of example only, and other arrangements and elements can be used instead and some elements may be omitted altogether. Further, as in most telecommunications applications, those skilled in the art will appreciate that many of the elements described herein are functional entities that may be implemented as hardware, firmware and/or software, and as discrete components or in conjunction with other components, in any suitable combination and location.

By way of example, the wireless communication system 100 is shown to include a mobile station (MS) 102 in communication via an air interface 104 with a base transceiver station (BTS) 106, which is coupled to a base station controller (BSC) 108. The BSC 108 is also coupled to a network, depicted as MSC 114 in FIG. 1. Mobile stations such as cellular telephones, personal digital assistants (PDA), wireless modems, or other mobile nodes may be used in the wireless communication system 100.

BTS 106 includes one or more antennas arranged to produce radiation patterns defining one or more sectors. Additional BTSs 110 and 112 coupled to BSC 108 are also illustrated. Although three BTSs for each BSC are illustrated within FIG. 1, it will be understood that more or fewer BTSs may be present within the wireless communication system 100.

BSC 108 is an interface between BTSs 106, 110, and 112 and the MSC 114. BSC 108 also handles radio resource management and radio network management functions for BTSs 106, 110, and 112. The network connected to the BSC 108 may be any transport network and/or entity used to route signals to and from the MS 102. For example, the network may comprise a mobile switching center (MSC 114, as shown in FIG. 1), a packet data service node (PDSN), an Internet protocol (IP) network, the public switched telephone network (PSTN), or any other wireless communication transport network. In addition, the network may allow for connectivity to multiple switching platforms, such as a short message service center (SMSC) and an uplink server, for example.

Each of the couplings of the wireless communication system 100, excluding the air interface 104, may be interfaces using various physical, media access, and data link layer technologies, including such technologies as TDM trunks (e.g., trunk level 1 (T1) line), a packet-based link (e.g, IEEE 802.3, gigabit Ethernet line), or other connections.

The wireless communication system 100 may be divided geographically into a number of cell sites. At the core of each cell site is a BTS, such as BTSs 106, 110, and 112, whose antennas define a radio frequency (RF) radiation pattern. Further, each cell site may be divided into a number of sectors, each defined respectively by radiation patterns from directional antenna elements of the cell site's BTS. Each sector typically has a beam width of about 120 degrees. However, sectors can have any desired beam width.

The radiation pattern of each sector in a cell site produces an air interface that defines a respective coverage area, such as air interface 104. When an MS is positioned within such a coverage area, the air interface provides a communication path between the MS and the BTS. And the MS can then communicate through this path with entities on the wireless communication system 100.

In a typical CDMA wireless communication network, a subscriber connects to the base station and the network infrastructure by way of two separate wireless channels—one from the BTS to the MS, typically referred to as the forward channel, and one from the MS to the BTS, or the reverse channel. The signal processing associated with these communication channels is provided by channel elements.

The forward and reverse channels have different formats and utilize different physical and link layer signaling. Each channel in a CDMA system is identified by a number of parameters, including the frequency of the RF carrier, and various PN sequences that are sequentially applied to the data.

In particular, the forward channel uses a long PN code sequence to scramble the data, and a short PN code with a time offset that defines the sector. That is, all forward channels in a given sector use the same PN short code with the same offset. Other sectors may utilize the same short PN code, but with a different offset. In addition, each forward channel in a sector uses a specific PN Walsh code to identify data for a given user. The orthogonality of the Walsh codes separates the user channels within a given sector. In IS 95, there are sixty-four Walsh codes—one is used as a pilot, one (or from one to seven) is used for paging, and one is used for sync, leaving as many as sixty-one Walsh codes for sixty-one forward channels per sector. IN CDMA 2000, 128 Walsh codes are available. In either system, adjacent sectors may use the same set of Walsh codes due to the use of different short PN code offsets in those sectors.

For the reverse channel, the various PN codes are used in a different manner. First, each MS uses the Walsh codes as a symbol alphabet, whereby up to six data bits may be combined and represented by a single Walsh code. The short code is then applied, and is used for synchronization purposes. Finally, the individual user channels are identified by the offset of the long code. More particularly, the specific long code used to identify the MS's channel is made by "masking" the PN long code by a number determined mathematically by the handset's ESN. With over forty days of 1,228,800 chips/second to choose from, there are billions and billions of reverse traffic channels possible. Of course, reverse access channels are associated with each paging channel in the forward direction, which are publicly-defined long code offsets reserved for reverse-direction public traffic such as call originations, registrations, etc. After a BTS recognizes an MS on an access channel, its identity is known and the BTS redirects the MS to a traffic channel where it will use its own natural long code.

Figure 2:
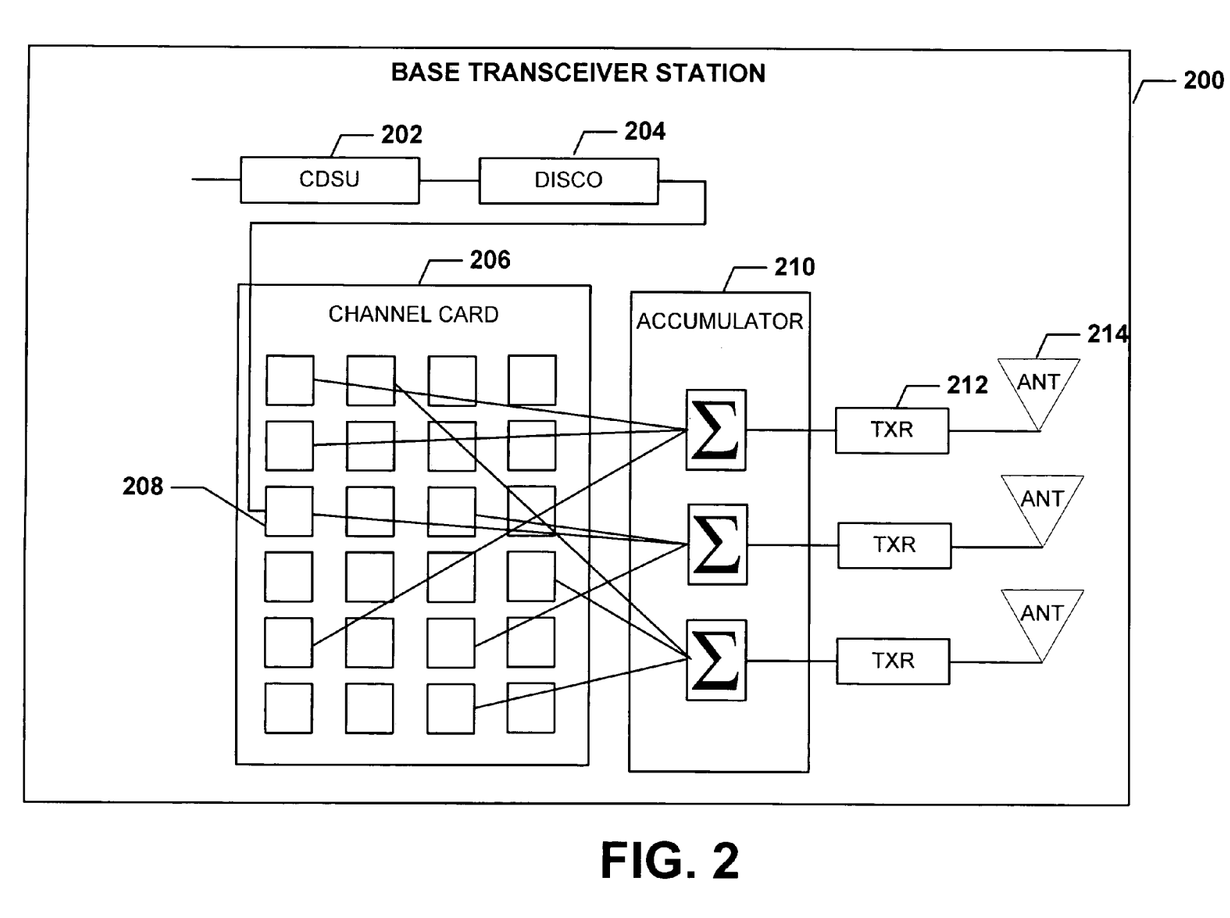
FIG. 2 illustrates a typical BTS architecture.

A typical BTS 200 architecture is shown in FIG. 2. The BTS includes a channel/data service unit CDSU 202 and a DISCO 204. The CDSU provides a communication interface for routing signals from a TDM network (e.g., a T-1 line) to the BTS. The DISCO 204 (DIStribution and COnsolidation unit) provides the communications path and the routing for data packets between various BSC subsystems and the BTSs, and typically routes traffic packets between SBS (soft base station) and BTS subsystems, such as routing the packets to the appropriate CE 208 on the channel element card 206. The outputs of the CEs are summed in accumulator 210, and provided to a corresponding transceiver 212 and RF antenna 214. As shown in FIG. 2, the CEs may be assigned to any channel on one of the available sectors and frequencies provided by the BTS.

Figure 5A:
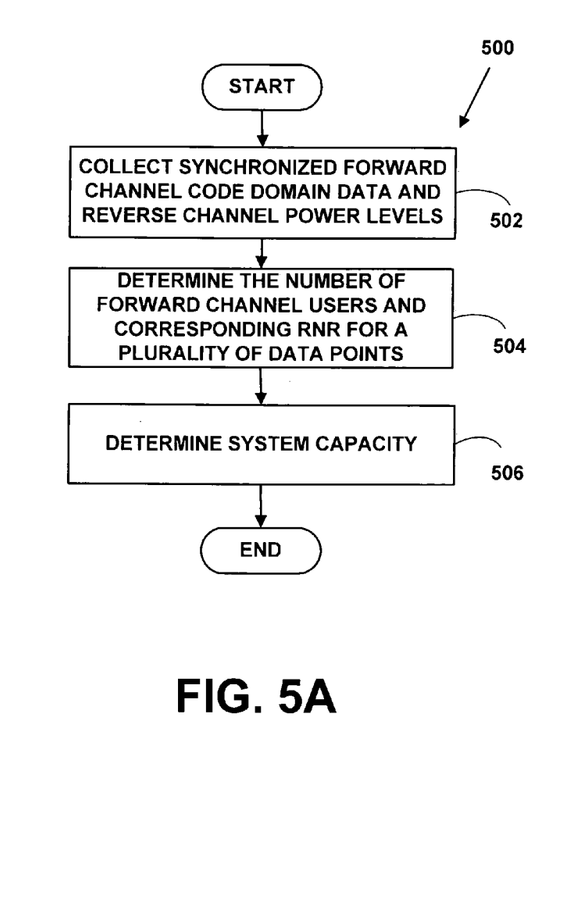
FIGS. 5A and 5B are preferred methods of measuring system performance.

One preferred method 500 of data collection and capacity measurement is shown in FIG. 5A. The tests are performed to obtain measurements of forward link code domain information and simultaneously obtain Reverse Noise Rise (RNR) measurement at step 502. RNR measures the rise of the noise floor in response to an increase in the number of users and/or an increase in the power per user in that sector (for a given carrier frequency). As the number of users on the reverse link and/or the mobile transmit power per user increases, the reverse noise floor rises. The preferred method of step 502 measures the noise level of the reverse link in non-busy hours (also referred to as a "maintenance window") to serve as a reference noise floor, and then measures the reverse noise during the busy hours (typically 4-6 pm and 9-11 pm) to determine the increase, or rise, in the effective noise level. In other embodiments, reverse noise rise data may be gathered during a selected time period and compared to data from another selected time period to obtain a relative measurement, which may be useful, for example, when determining the effect on the BTS performance of modifications to certain system parameters.

At step 504, the collected data is preferably analyzed to obtain one or more of the following values: the number of active users, the average power per link on the forward channels, and the corresponding RNR on the reverse channel. In addition, the power per link and the number of active links may be broken out by the type of communication session (2G, 3G voice, 3G data). Preferably, the forward link data (average power per link, number of active links) are analyzed as a function of the RNR.

In one exemplary method, the system capacity is determined by finding the maximum number of users such that the RNR does not exceed a given threshold. This may be desirable because as the RNR increases, a new user becomes less likely to obtain service. Variables other than the number of users may affect RNR, including the power per link, the distances that the mobiles are from the BTS, etc. System capacity measurements may therefore involve the use of a probability threshold, or confidence level, that the RNR will stay at or below a threshold level. Therefore, one method of determining system capacity further involves determining the number of users that will result in a desired probability (the confidence level) that the RNR will remain at or below a given RNR threshold (e.g., 3 dB RNR, but other values may be used). In this manner, the system capacity may be determined, and the system may be responsively configured to allow for a desired number of users.

Thus, one embodiment of determining system capacity includes forming a ratio of the number of measurements having an RNR below a threshold (for example, 3 dB) to the total number of measurements. Preferably, only measurements corresponding to those where the number of active users is at or below a specific number are used. The ratio then represents a measure of the probability that the RNR will be below the threshold when the number of active users does not exceed the specific number. If the ratio is acceptable, then the number of active users (and hence the number of measurements used to form the ratio) is increased until the probability is unacceptably low. System capacity is therefore the greatest number of users that results in an acceptable probability, or one that is within the defined confidence interval.

Figure 5B:
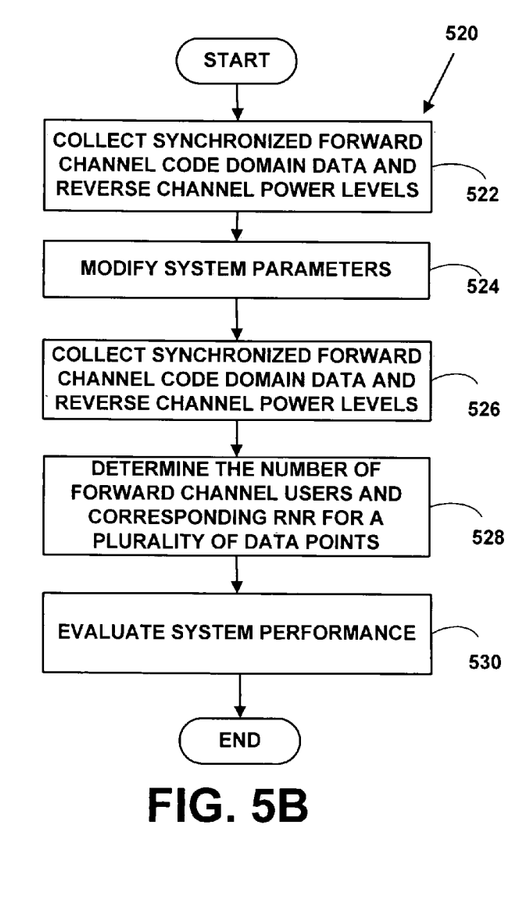

In alternative embodiments, the measurement techniques described herein may be used to evaluate system performance changes resulting from the modification of various system parameters. For example, power control algorithms may be modified, and then the system performance and capacity may be determined, as described with respect to method 520 depicted in FIG. 5B. At step 522, the reference data, comprising the forward channel data and corresponding RNR data, is collected. At step 524, the system parameters are modified. At step 526, the forward channel data and corresponding RNR data for the modified system is collected. At step 528, the number of active channels that result in an acceptable RNR is determined for the modified system, thereby allowing a performance evaluation of the modified system at step 530.

More specifically, power control in CDMA systems is performed on the reverse link and the forward link using open or closed loop power control. In open loop control, the mobile station uses the received pilot signal strength and internal algorithms to estimate what its transmit power should be, and adjust its own transmit power. This mechanism is typically used in access attempts by the mobile to determine the power level used to transmit its access probes. Once the mobile station has been granted access, it uses the closed loop power control.

In the closed loop control on the reverse link, an inner loop is used, whereby the BTS measures the received Eb/No and compares it to a set point. The BTS then sends the mobile station up to eight hundred power control bits per second. The mobile station uses these power control bits to adjust its transmit power (typically in approximately 1 dB increments). In addition, an outer loop control is used, whereby the BTS determines the frame error rate, and if it is too low, may use the closed loop control bits to request that the mobile transmit additional power. Typically this is done by adjusting the Eb/No set point.

The power control used on the forward link is a closed loop method. The mobile measures the frame error rate (FER) and sends reports back to the BTS, which then responsively adjusts its transmit power. The BTS transmits a power control parameter message to the mobile station, which typically includes various parameters including the power control reporting threshold, the power control reporting frame count, the threshold report indicator, the periodic report indicator, and the power report delay parameter.

Numerous system parameters of the power control algorithm may be modified in an attempt to improve system performance and increase system capacity. As described above, the set points, the mobile station power rails (minimum and maximum mobile transmit power), the FER thresholds, etc., may be altered. As a further example of a system parameter, mobile access probe parameters, including the number of probes to conduct, the power increment between unsuccessful probes, the back-off delay between probes, the increment by which the back-off delay is shortened after unsuccessful probes, etc. may all be modified.

In certain embodiments, the RNR may be measured before and after one or more system parameters are modified, and the system capacity may be compared to see if the parameter changes affected capacity in a positive or negative manner.

Figure 7:
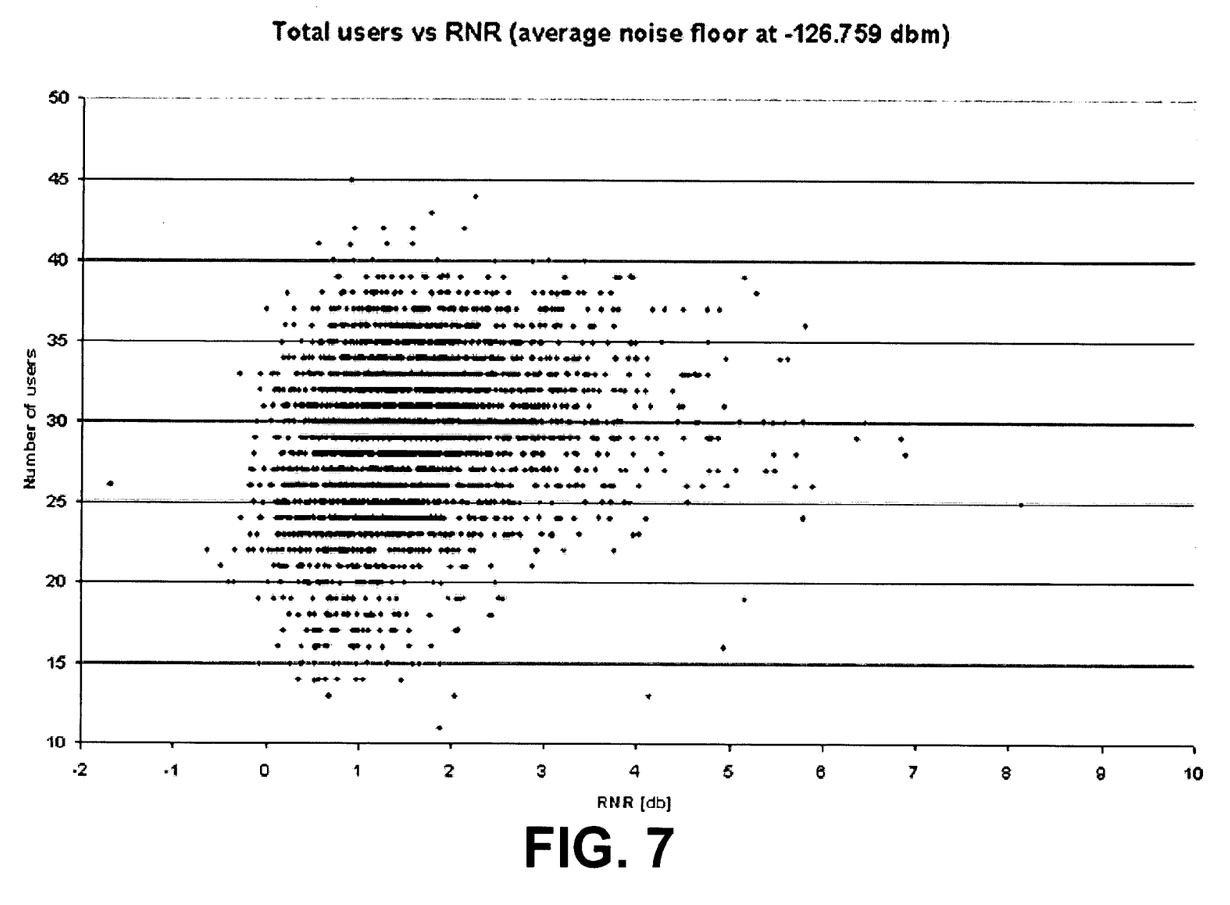
FIG. 7 is a two-dimensional plot of RNR versus the number of reverse users.
Figure 8:
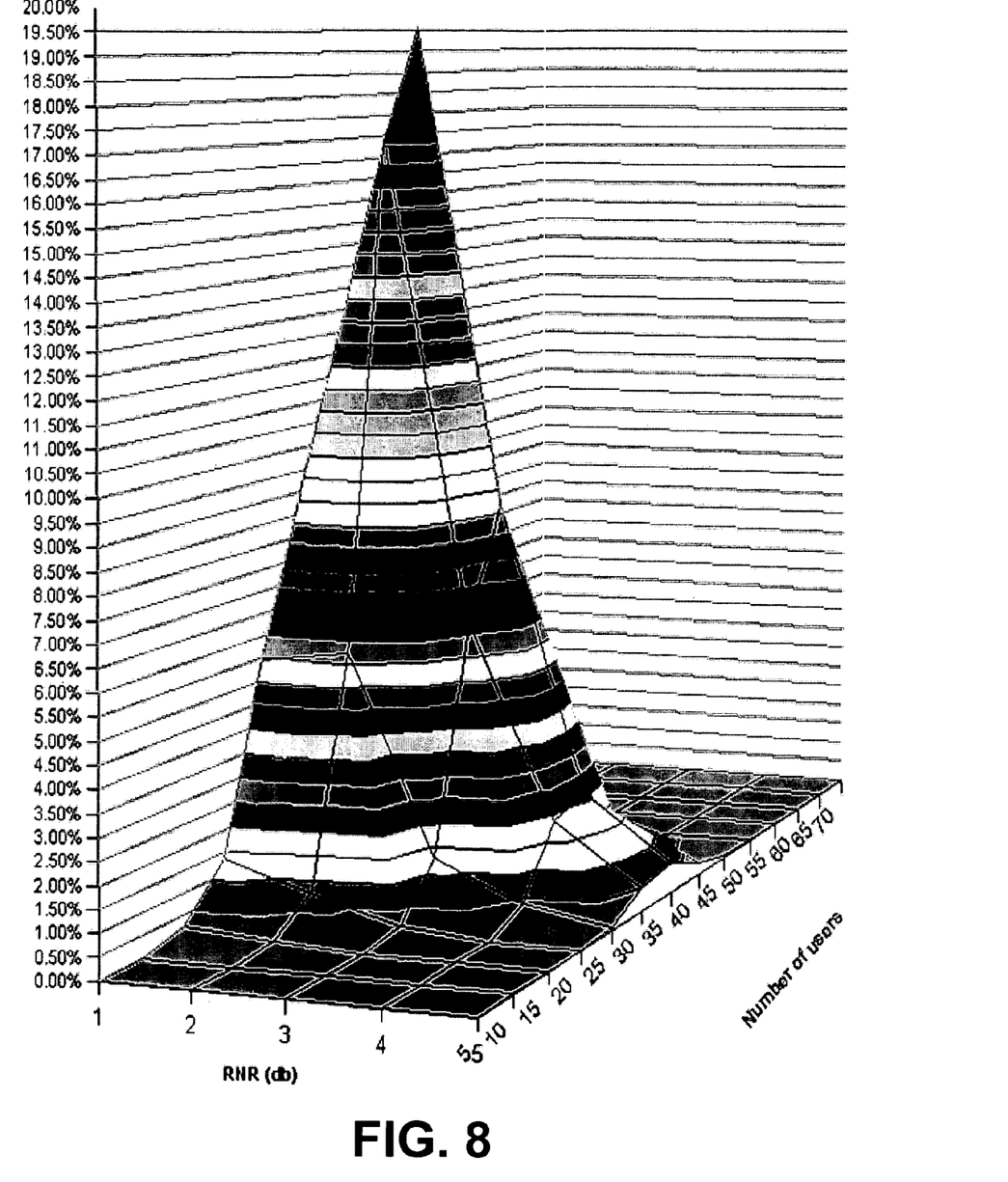
FIG. 8 is a three dimensional cdf plot of RNR versus the number of users.

The resulting data may be graphed as shown in FIG. 7. Each data measurement event is a point on the graph comprising the number of active users versus the corresponding RNR measurement at that time. Alternatively, the plot of FIG. 8 shows a histogram, or a probability distribution function (pdf), of the number of users versus the RNR. Still further, the pdf may be converted to a cumulative distribution function (cdf) depicting the total probability that the number of users and the RNR is less than specified numbers.

Figure 3:
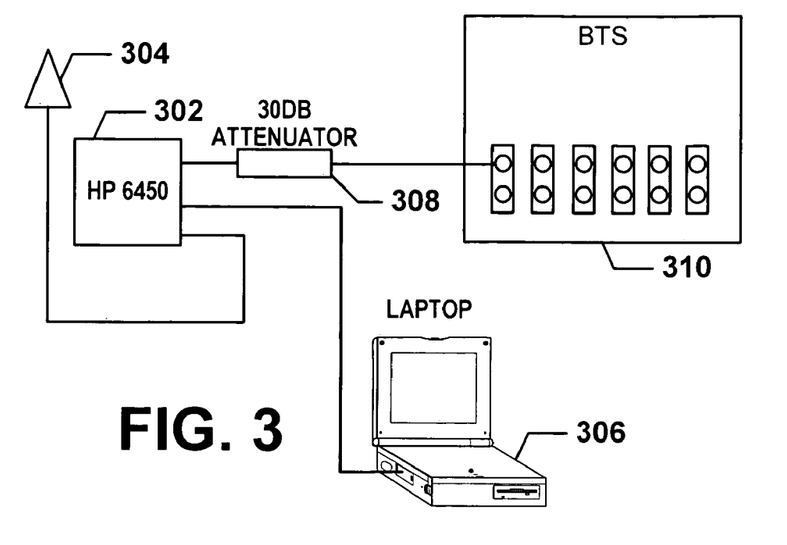
FIGS. 3 and 4 illustrate preferred test equipment configurations.

The preferred methods described herein may use various test equipment to measure and collect the required data. One configuration of suitable equipment to collect forward link data is shown in FIG. 3. Test unit 302 is preferably an Agilent (formerly Hewlett Packard) Viper™ E6450C receiver, a GPS antenna 304, a laptop computer 306 with 3G BOAT HP software (6474A BOAT software), a DB9 serial cable to connect the laptop 306 to the BOAT receiver 302, and 20 dB+10 dB attenuators 308 (for a 30 db attenuation total) that connects the BTS 310 to the BOAT receiver 302. The Viper™ 308 is connected (via the attenuators 308) to the "BTS TX" test port of the appropriate Sector on the BTS 310.

Figure 6:
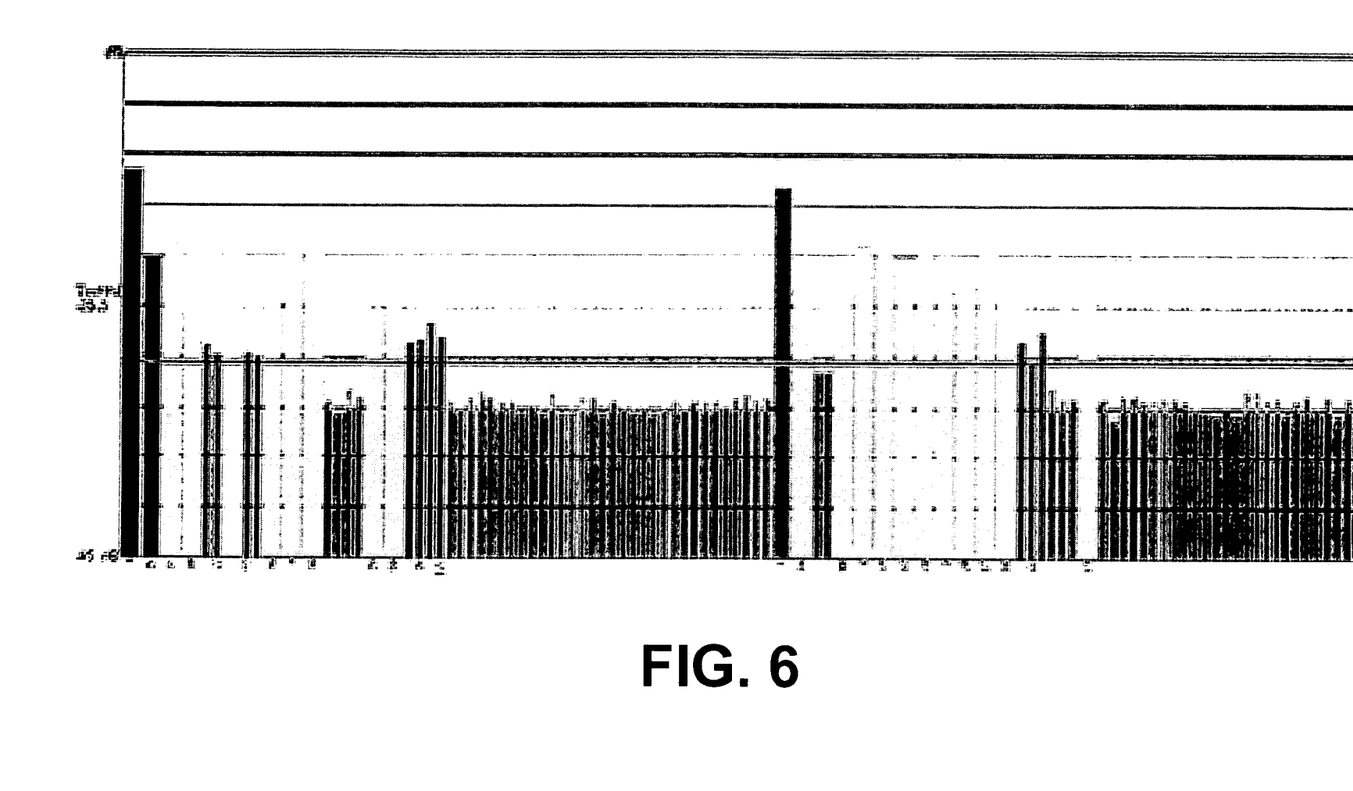
FIG. 6 is a graph of typical data collected in a wireless system.

The laptop computer is preferably configured using the Agilent BOAT software application (Agilent E6474A), by first selecting the "auto config" to locate the connected hardware. The software is then configured to perform the preferred measurements by selecting the measurements tab, and the "add" button at the bottom of the menu. Under measurement type, "GPS" is selected (to ensure correct PN identification), and the add GPS in the description field. Then select "add" from the bottom menu and select "Boat" for measurement type. Choose "PCS receiver" for hardware and name the device "Boat" in the description field. Several checkboxes should be modified before saving this measurement. First select "Top N" under measurement type, and select "Code Domain Trace" and "Code Domain Stats". Type the number 1 in the "Top N" box. Only one PN is needed for this test thus this configuration is for a unique PN. The PN increment should be set to 1, and the carrier tracking should be selected from the "other" configuration box. The carrier tracking option should not be selected for this test. The Pilot dominance should be set to 10 dB, the Freq. Units should be set to channel, and the band should be set to down link because the forward link data is being collected from the base station. The Carrier should be set to Channel 350 (or appropriate channel for test). The configuration should now be saved. The forward link data obtained in a given measurement is depicted in FIG. 6, which shows the code domain along the horizontal axis, and the power level along the vertical axis. The power level of each individual Walsh code is measured and stored.

In an alternative embodiment, the BTS 310 itself may incorporate the necessary data gathering equipment. Specifically, the BTS may be configured to provide data relating to the number of active walsh codes and their corresponding power levels, either in absolute terms, or in relation to the pilot signal strength, together with a timestamp. In either embodiment, the forward code domain measurements preferably include a plurality of data sets, each set having a timestamp, a plurality of code IDs, and power levels for each code ID.

Figure 4:
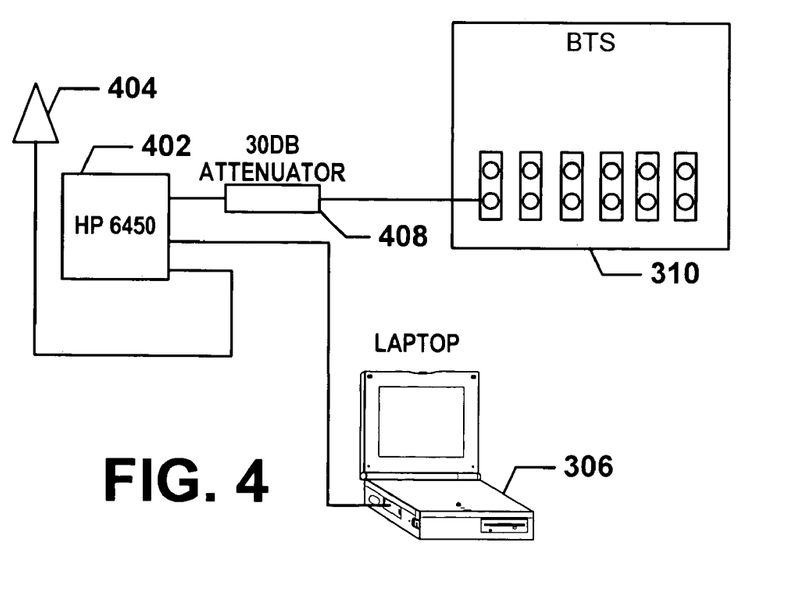

The equipment setup for collecting data on the reverse channels is depicted in FIG. 4. The configuration is the same as FIG. 3, with the exception that the laptop is configured with Agilent E7474A software, and the Viper™ test equipment is connected to the RX port of the BTS 310. The resolution bandwidth of the test equipment is preferably set to 30 Khz, the IF bandwidth to 1.25 Mhz, and the time to 1 sec. Alternatively, the two Viper receivers may be interconnected in a daisy-chain configuration and connected to a single laptop device. This configuration has the added advantage of not requiring extra steps to ensure the synchronization of the data collection windows and/or laptop system clocks.

The reverse data collection is performed simultaneously and stored by the Viper test equipment. The initial reverse link data collection is performed in the non-busy hour. Preferably, the Fwd Link measurement (BOAT Code Domain analyzer), which shows the number of users, is synchronized with the reverse power measurement. The collection of the forward link data during the initial noise floor determination is optional, and may be used to verify that the reverse measurements are not a result of actual reverse channel traffic.

Data may then be collected during the busy hour to determine the RNR, which is the relative increase of the reverse noise as compared to the non-busy hour. The RNR is collected using the equipment configuration of FIG. 4, as described above. The reverse power measurements must be synchronized in time with the forward link measurements using the Code Domain analyzer, which provides the number of users.

Post processing is preferably performed using the following software: HP-Agilent E6474C (version 2.10a12 or similar version); a suitable database program, such as Microsoft Access® database; a suitable spreadsheet program, such as Microsoft Excel® spreadsheet. Additionally, a script for formatting data into an appropriate layout is used to convert the data. In the preferred embodiment, the exported data files created by the HP-Agilent software is converted into values suitable for use in Excel templates. The Excel templates are used to normalize the data to obtain the power-per-link values. In addition, the scripts are used to separate 2G and 3G data by looking at flag in the exported data. Still further, the 3G data is preferably separated into voice sessions and data sessions.

The first step of the post processing in the preferred method is to start the HP-Agilent E6474A application, and open the (.SD5) file generated by the time the measurements were collected. Using the menu File>Export . . . command, the data is exported to a set of files. Of the five files created by the export process, only two are used in the preferred embodiment: "DragonFly CDMA 2000 Code Domain Power.txt" and "DragonFly CDMA 2000 CDP Stats.txt". These two files are then manipulated by a script or other software utility referred to herein as the Capacity Test Data Translator, which forms the following five files:

(1) Is95.xls: This file contains a column for each Walsh code, Io, estimated Rho and Time. This information refers only to an IS-95 used Walsh codes or links.

(2) CDMA2000.xls: This file contains a column for each of the 128 Walsh codes, Io, estimated Rho and Time. This information refers only to a CDMA 2000 used Walsh codes or links.

(3) 3G_sesions_data.xls: This file contains the following columns: Num_session, 9600 or undefined, 19200, 38400, 76800, 153600, Reserved, and Time. Num_Sesion will contain the total number of data sessions on that specific time stamp, Time will contain time information, Reserved is for future use and the remaining columns (9600 or undefined, 19200, 38400, 76800, 153600), whose names refer to values of data rates, contain the number of data sessions for those data rates.

(4) 3G_sesions_voice.xls: This file contains information about the number of 3G voice calls measured on the test. The file has the same columns as the previously described file. The meaning of the columns is the same as above, with the understanding that columns 9600 or undefined, or 19200 is expected, because this file is intended for storing the number of 3G voice calls.

(5) 3G_utilization.xls: This table contains a column for each of the 128 Walsh codes and a column called Total. Total will contain the sum of all active Walsh codes that were active during the measurement interval. The columns specifying each Walsh code will contain the number of times that Walsh code was active during the measurement interval.

Spreadsheet templates (or other suitable software routines) are then used to make calculations of power-per-link and to calibrate the measurements. This process is preferably performed for both the IS-95 file and the CDMA2000 file. The spreadsheet template automatically calculates a power offset value to normalize the power measurements. The offset is determined by comparing the measured values of the pilot to the known pilot power level. All remaining measurements are revised according to the calibration offset value determined from the pilot measurement error or offset. The post-processing calibration procedure and graphing is preferably applied separately to the data for IS-95 (Is95.xls) and the 3G data (CDMA2000.xls).

The calibrated measurement data is then input to a graphing utility. One preferred graphing utility are one or more spreadsheet templates or workbooks (groups of related spreadsheet data sheets) having a data input sheet, and additional sheets having pre-formatted graphs that import the graphed data from the input sheet. The graphs preferably include a plot of the number of links versus time, power per link versus users (pp l vs l), power per link versus time (pp l), RNR versus time, and finally number of user versus RNR in the form of a probability distribution and cumulative distribution function.

D. Other Examples

Those skilled in the art to which the present invention pertains may make modifications resulting in other embodiments employing principles of the present invention without departing from its spirit or characteristics. Accordingly, the described embodiments are to be considered in all respects only as illustrative, and not restrictive, and the scope of the present invention is, therefore, indicated by the appended claims rather than by the foregoing description. Consequently, while the present invention has been described with reference to particular embodiments, modifications apparent to those skilled in the art would still fall within the scope of the invention.

We claim:

1. A method of determining a wireless system capacity, the method comprising the steps of:
   determining a reverse noise floor;
   obtaining a plurality of forward code domain measurements and corresponding reverse noise measurements;
   analyzing the obtained measurements so as to obtain a plurality of data values, wherein the plurality of data values includes (i) a plurality of data values that indicate a number of active users, and (ii) for each data value that indicates a number of active users, a data value that indicates a corresponding reverse noise rise (RNR); and
   determining a maximum number of users such that a probability of exceeding a predetermined RNR is below a threshold, wherein the probability is determined from a ratio of a number of the measurements having an RNR below the predetermined RNR to a number of measurements corresponding to those at or below a specific number of active users.

2. The method of claim 1 wherein the forward code domain measurements comprise the number of active forward links.

3. The method of claim 1 wherein the step of determining a reverse noise floor is performed by obtaining reverse noise measurements during a period of inactivity.

4. The method of claim 1 wherein the step of determining a maximum number of users includes determining revere noise rise measurements by comparing the reverse noise measurements to the reverse noise floor.

5. The method of claim 1 wherein the plurality of forward code domain measurements are obtained from a base station transceiver.

6. The method of claim 5, wherein obtaining the forward code domain measurements and the corresponding reverse noise measurements is carried out at a computer remote from the base station transceiver.

7. The method of claim 1, further comprising:
   modifying at least one system parameter,
   wherein the at least one system parameter is a power control parameter.

8. The method of claim 1, further comprising:
   modifying at least one parameter, wherein the at least one system parameter is a mobile access probe parameter.

9. The method of claim 1, wherein each forward code domain measurement of the plurality of forward code domain measurements includes a data set having a timestamp, a plurality of code IDs, and power levels for each code ID.

10. The method of claim 1, further comprising:
displaying a visual indicator that depicts a number of active users versus a corresponding RNR measurement at a given time,
wherein the visual indicator is selected from the group consisting of (i) a graph, (ii) a histogram, and (iii) a probability distribution function plot.

11. The method of claim 1, wherein the predetermined RNR is 3 dB.

12. The method of claim 1, wherein the forward code domain measurements and reverse noise measurements are obtained substantially simultaneously.

13. The method of claim 1, wherein each forward code domain measurement and the reverse noise measurement corresponding to the forward code domain measurement are obtained substantially simultaneously.

14. The method of claim 1, wherein the threshold comprises a probability threshold.

15. The method of claim 1, further comprising:
displaying a probability distribution function plot that depicts a number of active users versus a corresponding RNR measurement at a given time.

16. The method of claim 15, further comprising:
converting the probability distribution function plot to a cumulative distribution function.

17. The method of claim 1, further comprising:
displaying a histogram that depicts a number of active users versus a corresponding RNR measurement at a given time.

* * * * *